Patented July 21, 1953

2,646,441

UNITED STATES PATENT OFFICE 2,646,441

PROCESS FOR DEHALOGENATING HALOGENOSILANES

John Joseph Duane, Buffalo, N. Y., assignor, by mesne assignments, to Union Carbide and Carbon Corporation, a corporation of New York No Drawing. Application December 17, 1949, Serial No. 133,689

8 Claims. (Cl. 260—448.2)

The invention is a process for treating halogenosilanes to remove their halogen and form organosiloxanes (compounds containing one or more SiOSi groups in the molecule), or to form organosilanols (compounds containing the group SiOH and adapted to be converted into siloxanes), or to form mixtures of silanols with siloxanes. Siloxanes are formed by the condensation of silanols,

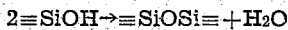

or by the reaction of a silanol with another silicon compound, such as a chlorosilane,

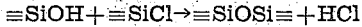

Many methods have been proposed for preparing silanols by the hydrolysis of chlorosilanes, the essential reaction being

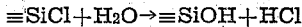

These methods are all open to the objection that, in the presence of a sufficient quantity of water to effect the hydrolysis, the reaction cannot be adequately controlled. It is usually the objective to produce silanols which contain SiH, SiR and/or SiOR linkages (R being alkyl or aryl) in order that these groups may be carried over into siloxanes made from the silanols; but by known methods this objective, when attainable at all, is reached only imperfectly and by unduly complicated procedure. In the presence of water there is a tendency for SiH and SiOR linkages to be broken and lost, and for condensation to proceed at an uncontrollable rate simultaneously with the hydrolysis, so that the product may be a worthless hydrated silica or an unstable polymer which sets to a gel before it can be put to its intended use. Such difficulties are illustrated by the following test:

Diphenoxydichlorosilane was prepared by refluxing phenol with silicon tetrachloride and distilling the product under reduced pressure. The fraction boiling at 100°–110° C. under 2 mm. pressure was collected, and dissolved in ethyl ether. A portion of the solution was stirred into an approximately normal aqueous solution of sodium hydroxide held at 0° C. Silica and phenol were the only products recovered. Another portion of the ether solution was stirred into crushed ice. Again insoluble silicious material and phenol were the products.

The object of the invention is to provide an improved process for the preparation of silanols and/or siloxanes. This object is attained by replacing the halogen of $\equiv$SiX under substantially anhydrous conditions.

In accordance with the invention, a halogenosilane such as a chlorosilane is caused to react with a bicarbonate or bisulphite of a metal such as sodium or potassium, in substantial absence of water. These salts, it will be noted, are the acid salts of acids assumed to exist in solution but never isolated because, if they do exist, they readily decompose into water and their respective volatile anhydrides.

Using a bicarbonate as the acid salt, the reaction is preferably carried out by adding one of the reagents (e. g. bicarbonate or chlorosilane) portionwise to the other, and this may be done in either order. The choice of the order will depend on the conditions, as will hereinafter more fully appear. The reaction is preferably carried out in the presence of a non-aqueous solvent for the desired product, such as ethyl ether, acetone, toluene, xylene, petroleum ether, or mixtures of these. Thus sodium bicarbonate, alone or in suspension in a solvent, may be added portionwise to a chlorosilane or a mixture of organosilicon compounds including one or more chlorosilanes. The silicon compound or compounds may be in solution. Or the procedure may be reversed, the chlorosilane being added to the bicarbonate so that an excess of bicarbonate is present during at least most of the process. Artificial cooling is usually not required.

When the reaction is carried out in the presence of an excess of bicarbonate, it appears to take, principally, the following course:

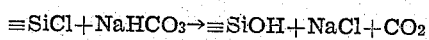

With the chlorosilane in excess, HCl is evolved, indicating that condensation is occurring as, for example,

There are in fact some condensation products or polymers present in the product regardless of the way in which the reactants are brought together, but the product is nevertheless soluble, and in general so stable and of such low molecular weight that it can be stored, especially in the dissolved state, without gelling.

As has been indicated above, the modification of the invention wherein the bicarbonate is added slowly to the chlorosilane favors the incidence of polymers in the product. Thus, proceeding in this way, diethyldichlorosilane is readily converted into the soluble, relatively low molecular weight polymer hexaethylcyclotrisiloxane, as shown by the following example:

Example 1

Sodium bicarbonate, 2000 grams, was added portionwise over a period of one hour to 14 gram mols of diethyldichlorosilane dissolved in 2000 cc. of ethyl ether. The liquid was filtered and the ether evaporated. Vacuum distillation gave a 70% yield of hexaethylcyclotrisiloxane.

The process described in the foregoing example involved no difficult or time-consuming operation. It is to be contrasted with the treatment of diethyldichlorosilane by a method heretofore used to prepare the same product.

Twenty-eight gram mols of diethyldichlorosilane was slowly stirred into a mixture of 4000 cc. of ethyl ether and 2000 cc. of water. After all the diethyldichlorosilane had been added and evolution of hydrogen chloride had subsided, 2000 cc. of water was added to cause the ether solution to separate. The ether phase was washed 5 times in an attempt to free the product of acid, and when this proved ineffectual it was washed twice with dilute ammonia water. Three additional water washes were required to rid the system of ammonia. This was attended with emulsification, which made phase separation difficult and time-consuming. The product was finally stripped of ether and gave a 45% yield of hexaethylcyclotrisiloxane on fractional distillation under reduced pressure.

The difficulties encountered in attempting, by aqueous methods, to convert diphenoxydichlorosilane into siloxanes have already been mentioned. By contrast, the present invention permits this conversion to be made easily and efficiently, as shown by the following example:

Example 2

Diphenoxydichlorosilane was prepared by refluxing 2.35 mols of phenol with 1 mol of silicon tetrachloride and 200 cc. of toluene for 15 hours. The product was stripped of toluene, cooled, and diluted with 200 cc. of acetone, and 1.13 mols of granular sodium bicarbonate was then added at room temperature. Carbon dioxide and hydrogen chloride were evolved during the addition of the bicarbonate, and sodium chloride remained suspended in the acetone solution. This was separated by filtration, and the product was recovered by evaporating the acetone. It was then stripped of volatile material by heating to 300° C. under 20 mm. pressure.

Analysis of the product showed an average of two phenoxy groups per silicon atom. The yield was 75% as based on conversion of $SiCl_4$ to cyclic diphenoxypolysiloxanes, $[(C_6H_5O)_2SiO]_x$. The material had a pour point of $-20°$ C., a viscosity of 167 centistokes at 20° C., and an average molecular weight of 1150. It proved to be stable for long periods when used as a thermostat fluid at 800° F.

The following example illustrates the invention as applied to diethyldichlorosilane, where the conditions of Example 1 were reversed and the organosilicon compound was added to an excess of $NaHCO_3$:

Example 3

Two mols of diethyldichlorosilane was added slowly with vigorous agitation to a large excess of sodium bicarbonate suspended in 2500 cc. of ethyl ether. After filtering to remove sodium chloride and unreacted bicarbonate, the ether was removed by evaporation under reduced pressure. The product, a crystalline mass, was purified by washing with petroleum ether. An 86% yield of diethylsilanediol, M. P. 85° C., was obtained. The remainder contained low molecular weight OH-terminated polysiloxanes.

The preponderance of a silanol in the product, as contrasted with the siloxane of Example 1, is to be noted.

The following is an example of the invention as applied to the trifunctional compound $$(C_2H_5)SiCl_3$$

Example 4

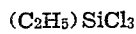

Three gram mols of ethyl trichlorosilane was added to a slurry of 900 grams of sodium bicarbonate in 2000 cc. of acetone. After reaction was complete, the mixture was filtered, the solids were washed with acetone, and 500 cc. of isopropanol was added to the filterate and washings. The acetone was distilled off, leaving an isopropanol solution of the product. The fact that the product was soluble in this alcohol shows a high proportion of SiOH groups. A film of the solution underwent condensation at room temperature in the absence of a catalyst in the course of some days to form a tack-free coating.

It was found that by using a very large excess of bicarbonate over that required to displace the silanic chlorine, a water-soluble product closely approaching $C_2H_5Si(OH)_3$ could be made.

The following example shows the preparation of a silanol from a chlorosilane containing the SiH linkage, without destruction of the latter:

Example 5

One half gram mol of ethyldichlorosilane in 100 cc. of acetone was added, at room temperature with vigorous agitation, to one mol of sodium bicarbonate suspended in 100 cc. of acetone. No attempt was made to control the temperature. The product was recovered by filtering, and evaporating the solvent. A solution of the product did not gel on storage. On testing the waterproofing properties of the product by applying a solution thereof to cotton cloth, its high efficacy was deemed to indicate that the SiH bond of the starting material had not been destroyed.

The bicarbonate method has proved especially useful in the copolymerization of mixtures of chlorosilanes having widely different reaction rates with water. Successful aqueous methods have not been found for making copolymers from such mixtures as amyltrichlorosilane with trichlorosilane. Each of these compounds tends to hydrolyze and condense separately. The trichlorosilane goes rapidly to insoluble hydrated silicon compounds while the amyltrichlorosilane hydrolyzes slowly to liquid products. Remedial methods, successful in other connections, serve only to convert the trichlorosilane into silicon oxyhydride $(SiHO_{1.5})_x$. With sodium bicarbonate the copolymerization proceeds smoothly.

Another application of the bicarbonate method to effect copolymerization is shown in the following example:

Example 6

A mixture consisting of 30 grams of bis(trichlorosilyl)ethane, 40 grams of phenyltrichlorosilane, 100 grams of ethyltrichlorosilane and 30 grams of diethyldichlorosilane was added at room temperature to a suspension of 300 grams of sodium bicarbonate in a mixture of 100 cc. of toluene with 500 cc. of acetone. After reaction was complete, the solution was filtered and stripped of solvent at 145° C. The product was then cut with toluene to a suitable consistency for painting.

Test panels coated with the siloxane polymers thus obtained cured in 30 minutes at 150° C. to a glossy surface of 8H pencil hardness. The coatings were flexible and adherent, and withstood the action of boiling solutions of alkali cleaners. Polymers made by the method described above are useful for coating food containers.

In addition to the organosilicon compounds which have been mentioned herein, the bicarbonate procedure has been successfully applied to ethyltrichlorosilane, amyltrichlorosilane, phenyltrichlorosilane, vinyltrichlorosilane, gamma-chloropropyltrichlorosilane, nonyltrichlorosilane, dimethyldichlorosilane and ethylpropoxydichlorosilane.

In some cases, particularly when acetone is not used as a solvent, the bicarbonate reaction starts more promptly and proceeds more smoothly if a little water is added. This water is to be regarded as a catalyst rather than a reactant since the amount used falls far short of the stoichiometrical equivalent of the halogen to be displaced.

When a bicarbonate other than the sodium salt is used, the reaction follows the same course as is shown by the following example:

*Example 7*

One gram mol of diethyl dichlorosilane was added slowly to an agitated slurry of 3 mols of potassium bicarbonate in 800 cc. of acetone. There was vigorous effervescence, as when sodium bicarbonate is used. When it had subsided, the mixture was filtered and the acetone was removed by gentle heating under 20 mm. pressure. The residue was a very mobile liquid which upon extraction with ether yielded crystalline $(C_2H_5)_2Si(OH)_2$.

The following is an example of operation with a bisulfite:

*Example 8*

One gram mol of diethyl dichlorosilane was added slowly to an agitated slurry with 3 mols of sodium bisulfite in 800 cc. of ethyl ether and 5 cc. of water. The reaction proceeded smoothly but there was almost none of the effervescence occurring with bicarbonates. After the chlorosilane had all been added, the slurry was agitated for one hour and then filtered. The solvent was removed as in Example 7. A neutral liquid residue of polymer was obtained having the strong camphor-like odor which is characteristic of silanols. The polymer was found by analysis to conform to the formula $(C_2H_5)_2SiO_{.65}(OH)_{0.7}$. The chlorine content—0.76%—was negligible.

What is claimed is:

1. Process for converting alkylchlorosilanes to silanol compounds which comprises reacting an alkylchlorosilane with sodium bicarbonate under substantially anhydrous conditions.

2. Process for converting diethyldichlorosilane to a silanol which comprises reacting the chlorosilane in a solvent with sodium bicarbonate, while maintaining substantially anhydrous conditions.

3. Process of converting an organo halogenosilane taken from the group consisting of hydrocarbon and hydrocarbonoxy halogenosilanes to an organosilicon compound substantially free from halogen which comprises reacting the halogenosilane with a metal salt of the group consisting of sodium bicarbonate, sodium bisulphite, potassium bicarbonate, and potassium bisulphite under substantially anhydrous conditions.

4. Process of converting a hydrocarbon halogenosilane to a silicon compound substantially free from halogen which comprises reacting the halogenosilane with a metal salt of the group consisting of sodium bicarbonate, sodium bisulphite, potassium bicarbonate, and potassium bisulphite under substantially anhydrous conditions.

5. Process of converting a hydrocarbon chlorosilane containing the Si—H linkage to a hydrocarbon silicon compound substantially free from chlorine which comprises reacting said chlorosilane with a metal salt taken from the group consisting of sodium bicarbonate, sodium bisulphite, potassium bicarbonate, and potassium bisulphite under substantially anhydrous conditions.

6. Process of converting a hydrocarbonoxy chlorosilane to a silicon compound substantially free from chlorine which comprises reacting a chlorosilane with a metal salt taken from the group consisting of sodium bicarbonate, sodium bisulphite, potassium bicarbonate, and potassium bisulphite under substantially anhydrous conditions.

7. Process of converting a mixture of hydrocarbon halogenosilanes to a silicon compound substantially free from chlorine which comprises reacting said mixture with potassium bicarbonate under substantially anhydrous conditions.

8. Process of converting a mixture of hydrocarbon halogenosilanes to a silicon compound substantially free from chlorine which comprises reacting said mixture with sodium bicarbonate under substantially anhydrous conditions.

JOHN JOSEPH DUANE.

References Cited in the file of this patent

UNITED STATES PATENTS

| Number | Name | Date |
|---|---|---|
| 2,452,416 | Wright | Oct. 26, 1948 |
| 2,457,539 | Elliott et al. | Dec. 28, 1948 |

OTHER REFERENCES

Signer et al., Annalen der Chemie, vol. 488, 1931, pp. 56 and 65 to 68.

Mellor, Comprehensive Treatise on Inorganic and Theoretical Chemistry, vol. 6, page 967 (1935), Longmans Green and Co.